United States Patent
Huangfu et al.

(10) Patent No.: US 12,332,343 B2
(45) Date of Patent: Jun. 17, 2025

(54) ELECTROMAGNETIC NON-LINE-OF-SIGHT IMAGING METHOD BASED ON TIME REVERSAL AND COMPRESSED SENSING

(71) Applicant: ZHEJIANG UNIVERSITY, Zhejiang (CN)

(72) Inventors: Jiangtao Huangfu, Zhejiang (CN); Lusong Wei, Zhejiang (CN); Zhiyi Tang, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 476 days.

(21) Appl. No.: 17/419,714

(22) PCT Filed: Nov. 6, 2020

(86) PCT No.: PCT/CN2020/126926
§ 371 (c)(1),
(2) Date: Oct. 13, 2022

(87) PCT Pub. No.: WO2021/143306
PCT Pub. Date: Jul. 22, 2021

(65) Prior Publication Data
US 2023/0065110 A1 Mar. 2, 2023

(30) Foreign Application Priority Data

Jan. 19, 2020 (CN) .......................... 202010063070.7

(51) Int. Cl.
*G01S 13/89* (2006.01)
*G01S 7/03* (2006.01)
(Continued)

(52) U.S. Cl.
CPC ................ *G01S 13/89* (2013.01); *G01S 7/03* (2013.01); *G01S 13/93* (2013.01); *H01Q 1/40* (2013.01); *H01Q 21/00* (2013.01)

(58) Field of Classification Search
CPC ...... G01S 13/88; G01S 13/887; G01S 13/888; G01S 13/89; G01S 7/03; H01Q 3/46;
(Continued)

(56) References Cited

U.S. PATENT DOCUMENTS

| | | | |
|---|---|---|---|
| 9,316,732 B1 * | 4/2016 | Mohamadi | G01S 13/0209 |
| 11,675,070 B2 * | 6/2023 | Spielmann | G01S 13/89 |
| | | | 343/702 |

(Continued)

*Primary Examiner* — Peter M Bythrow
(74) *Attorney, Agent, or Firm* — Bochner PLLC; Andrew Bochner; Eric Kleinertz

(57) ABSTRACT

An electromagnetic non-line-of-sight imaging method based on time reversal and compressed sensing is provided. The electromagnetic signal passively scattered by the target behind the obstacle is received by the antenna, the contour imaging of the target is realized by using compressed sensing, the signal-to-noise ratio of the electromagnetic signal of the target is improved by using time reversal for the contour area, so as to achieve the purpose of staring at and detecting the non-line-of-sight target; a random radiation signal is transmitted for multiple times through active metasurface modulation, compressed sensing is performed for calculation imaging after receiving the signal to judge the number of targets and the contour area in the occluded area; for the target contour area, the amplitude and phase of signals obtained at different positions are adjusted by the active metasurface, so as to focus and scan the electromagnetic signals at different positions behind the obstacle. The method can detect the target in the unsealed scene behind the wall and the metal structure (3) which cannot be penetrated by electromagnetic signals, and expand the detection capability of the traditional detection and imaging radar.

5 Claims, 5 Drawing Sheets

(51) Int. Cl.
*G01S 13/93* (2020.01)
*H01Q 1/40* (2006.01)
*H01Q 21/00* (2006.01)

(58) Field of Classification Search
CPC ........ H01Q 1/40; H01Q 15/002; H01Q 21/00; H01Q 21/06
See application file for complete search history.

(56) References Cited

U.S. PATENT DOCUMENTS

| | | | |
|---|---|---|---|
| 2006/0214832 A1* | 9/2006 | Lee | H01Q 21/061 342/179 |
| 2007/0205937 A1* | 9/2007 | Thompson | G01S 7/414 342/159 |
| 2010/0117885 A1* | 5/2010 | Holbrook | G01S 13/89 342/22 |
| 2013/0082858 A1* | 4/2013 | Chambers | G06N 99/00 342/22 |
| 2013/0335256 A1* | 12/2013 | Smith | H01Q 3/22 342/22 |
| 2015/0030256 A1* | 1/2015 | Brady | G01S 17/89 382/254 |
| 2015/0077282 A1* | 3/2015 | Mohamadi | G01S 19/13 342/450 |
| 2015/0276926 A1* | 10/2015 | Bowers | G01S 13/887 342/368 |
| 2017/0212059 A1* | 7/2017 | Charvat | G01S 13/887 |
| 2019/0339380 A1* | 11/2019 | Marks | G01S 13/887 |
| 2019/0346545 A1* | 11/2019 | Sleasman | G01S 7/03 |
| 2021/0135373 A1* | 5/2021 | Spielmann | H01Q 13/10 |
| 2021/0405182 A1* | 12/2021 | Reynolds | G01S 13/887 |

* cited by examiner

ELECTROMAGNETIC NON-LINE-OF-SIGHT IMAGING METHOD BASED ON TIME REVERSAL AND COMPRESSED SENSING

This patent application claims the benefit and priority of Chinese Patent Application No. 202010063070.7 filed to China National Intellectual Property Administration on Jan. 19, 2020 and entitled "Electromagnetic Non-Line-Of-Sight Imaging Method Based On Time Reversal And Compressed Sensing", the disclosure of which is incorporated by reference herein in its entirety as part of the present application.

TECHNICAL FIELD

The present disclosure relates to the technical field of microwave imaging, in particular to an electromagnetic non-line-of-sight imaging method based on time reversal and compressed sensing.

BACKGROUND ART

Electromagnetic target detection has always been an important research direction in academic and engineering fields, which can enable unmanned vehicles and intelligent robots to effectively detect and avoid obstacles in complex environments, and improve their safety and reliability. When detecting, the signal transmitted by the electromagnetic wave source is affected by the target, resulting in the change of the received signal, which can be used to judge the target characteristics. Reflection, scattering and refraction are common physical processes that affect the propagation of electromagnetic waves and light waves. When the target is blocked by obstacles, electromagnetic target detection is usually carried out by using a microwave band which can transmit obstacles or a low frequency band which can diffract obstacles. However, in practice, the target is often blocked by metal objects, such as vehicles, and cannot be effectively detected.

Occluded target imaging is referred to as non-line-of-sight imaging, which needs to analyze the hidden scene information that cannot be reached by visual field, and locate, reconstruct and track the target of the hidden scene by means of image information processing and feature extraction. At this time, if the information such as multiple reflections and obstacle scattering in the environment can be used, the occluded target detection can be realized, the blind area can be reduced, and the target recognition ability in complex environment can be improved. This has potential applications not only in military investigation, but also in unmanned vehicles, robot vision, medical imaging, search and rescue and other fields.

SUMMARY

The purpose of the present disclosure is to overcome the shortcomings and defects existing in the prior art when detecting targets in occluded areas which cannot be penetrated by electromagnetic waves such as metal bodies and high-loss media, and provide a novel electromagnetic non-line-of-sight imaging method based on time reversal and compressed sensing, which can effectively converge target signals in occluded areas in a high scattering environment, suppress target multipath clutter, and improve imaging accuracy.

To achieve the above purpose, the present disclosure provides an electromagnetic non-line-of-sight imaging method based on time reversal and compressed sensing:

step 1) evenly dividing a target area V into m grids, placing a metal object with a known size and shape in each grid in sequence when there is no target in the target area, and setting m groups of control voltages to be applied to an antenna to establish m groups of detection electromagnetic waves with time reversal characteristics;

step 2) when there is a target in the target area V, using i groups of control voltages in the target area V to obtain i groups of detection electromagnetic waves with compressed sensing characteristics for multiple measurements, and obtaining the contour area V where the target is located by matrix inversion;

step 3) selecting p grids from the m grids so that the p grids cover the contour area V', transmitting the p groups of detection electromagnetic waves with time reversal characteristics corresponding to the p grids to the target for multiple measurements, normalizing the electromagnetic wave amplitude values in the p grids after each measurement, and synthesizing multiple measurement results to obtain the refined imaging of the target.

Further, the step 1) specifically comprises:

step 1.1) providing two groups of antenna arrays as a transmitting mode and a receiving mode, respectively, and providing active metasurface radomes at the transmitting antenna array and the receiving antenna array;

step 1.2) evenly dividing the unsealed target area V behind a wall/metal structure which is uncapable of being penetrated by electromagnetic waves into m grids, applying no control voltage to each unit of an active metasurface radome at the transmitting antenna array and the receiving antenna array, and placing a metal object with a known size and shape in the m grids of the target area V for measurement, wherein at each grid, electromagnetic waves transmitted by the transmitting antenna array are scattered around the edge of the wall/metal structure and then reach the target, and the receiving antenna array receives the scattering electromagnetic wave $E_{mtr}$ of the target;

step 1.3) applying control voltages to the basic unit of the active metasurface radome at the transmitting antenna array in each grid, so that after the electromagnetic waves $E_{mtr}{}^*$ re-transmitted by the transmitting antenna array pass through the active metasurface radome, compared with the scattered electromagnetic waves $E_{mtr}$ of the target received in step 1.2), the amplitude is unchanged and the phase is opposite, thereby obtaining m groups of control voltages, where the corner mark tr represents the measured electromagnetic field in the step of time reversal.

Further, the step 2) specifically comprises:

step 2.1) switching the transmitting mode of the antenna array to the receiving mode, switching the receiving mode of the antenna array to the transmitting mode, and providing active metasurface radomes at the transmitting antenna array and the receiving antenna array;

step 2.2) performing measurement when the target area is an empty field without any object, transmitting electromagnetic waves to the surface of the active metasurface radome by the transmitting antenna array, receiving the scattered electromagnetic waves from the target by the receiving antenna array, applying i groups of random control voltages to the basic unit of the active metasurface radome at the transmitting antenna array, applying no control voltages to each unit of the active metasurface radome at the receiving antenna array, so that after the electromagnetic wave transmitted by the transmitting antenna array is scattered around the edge of the wall/metal structure, reaches the target, get reflected by the target, scattered by the edge of the wall/metal structure and then is received by the receiving antenna array, the electromagnetic wave at the receiving antenna array will have random amplitude and phase which is denoted as $E_{ics}$, and the corner mark cs represents the measured electromagnetic field in the compressed sensing step;

step 2.3) when the target area is an empty field without any object, applying no control voltage to each unit of the active metasurface radome at the transmitting antenna array and the receiving antenna array, using a near-field measurement method to obtain the amplitude and phase $E_{tcs}$ of the transmitting antenna array in the target area V and the amplitude and phase $E_{rcs}$ of the receiving antenna array in the target area V;

step 2.4) placing a detection target in the target area V for measurement, applying i groups of control voltages which are the same as those in empty field measurement to the active metasurface radome at the transmitting antenna array, and applying no control voltage to each unit of the active metasurface radome at the receiving antenna array, so as to obtain the amplitude and phase $E_{totics}$ of electromagnetic waves received by the receiving antenna array;

step 2.5) establishing the imaging system model as follows:

$$g=Hf$$

$$g=(E_{totics}-E_{ics})$$

$$H=E_{tcs}E_{rcs}$$

where g denotes scattered echo signal matrix of all grids, H denotes measurement matrix of the imaging system, which is the product $E_{tcs}E_{rcs}$ of radiation fields of the transmitting antenna array and the receiving antenna array at the target area V, and f denotes target backscattering matrix of all grids;

step 2.6) performing matrix inversion on the backscattering matrix f in step 2.5) to obtain the target contour area V which is smaller and finer than the initial target area V.

Further, the antenna array using the transmission mode comprises a transmitting antenna array and an active metasurface radome, wherein the transmitting antenna array is formed by arranging a plurality of transmitting antenna units, the transmitting antenna unit has a square metal sheet structure, an active metasurface radome is provided in front of the transmitting surface of the transmitting antenna unit, each active metasurface radome basic unit comprises a radome substrate and an active metasurface structural unit, the active metasurface structural unit is installed on the radome substrate, and the active metasurface radome basic unit in front of the transmitting surface of each transmitting antenna unit arranges and forms the active metasurface radome according to the same array arrangement as the transmitting antenna unit.

Further, the antenna array using the receiving mode comprises a receiving antenna array and an active metasurface radome, wherein the receiving antenna array is formed by arranging a plurality of receiving antenna units, the receiving antenna unit has an annular metal sheet structure, an active metasurface radome is provided in front of the transmitting surface of the receiving antenna unit, each active metasurface radome basic unit comprises a radome substrate and an active metasurface structural unit, the active metasurface structural unit is installed on the radome substrate, and the active metasurface radome basic unit in front of the transmitting surface of each receiving antenna unit arranges and forms the active metasurface radome according to the same array arrangement as the receiving antenna unit.

Further, the active metasurface radome unit comprises two H-shaped electrode plates, the two electrode plates are oppositely arranged, interdigital electrodes are arranged and connected on the opposite sides of the two electrode plates, and the opposite sides of the two electrode plates are connected by varactors.

According to the specific embodiment provided by the present disclosure, the present disclosure discloses the following technical effects.

1) In the electromagnetic wave band, the present disclosure realizes the enhancement of the detection signal of the occluded area behind the obstacle. According to the obstacles and the surrounding environment, the active metasurface structure is used to modulate the radiation direction and the phase and spatial distribution of the transmitting antenna, forming a detection beam with time reversal characteristics. Compared with the current research in the field of electromagnetism and optics, the present disclosure can improve the signal strength and the detection signal-to-noise ratio in the occluded area, and expand the detection range and application scenarios.

2) According to the present disclosure, contour imaging of the occluded target is obtained through compressed sensing. Multi-frequency, multi-position and multi-time data reception is carried out by using the receiving antenna array, which enriches the data volume of the received signal and obtains target contour imaging that breaks through the aperture limit. This imaging reconstructing method can overcome the defect that the traditional imaging method cannot detect the target in the occluded area, and has great flexibility in system implementation.

3) Compared with the existing scheme of the multi-transmitting array beamforming and multi-sensing array information acquiring for target information reconstruction in scattered signals, the present disclosure uses fewer receiving and transmitting channels and obtains higher imaging accuracy.

4) The present disclosure uses as few transmitting antenna units as possible to obtain more radiation amplitude and phase combinations. At the same time, the receiving channel does not need to carry out high-density measurement of the spatial distribution of the received signals, but can carry out imaging calculation with as few data received by the receiving antenna units as possible, thus having the advantages of low system implementation complexity and strong expansion capability.

BRIEF DESCRIPTION OF THE DRAWINGS

In order to explain the embodiments of the present disclosure or the technical scheme in the prior art more clearly, the drawings needed in the embodiments will be briefly introduced hereinafter. Obviously, the drawings in the following description are only some embodiments of the present disclosure. For those skilled in the art, other drawings can be obtained according to these drawings without paying creative labor.

Description of reference numbers: 1—antenna array in transmitting mode, 2—antenna array in receiving mode, 3—wall/metal structure, 4—metal object with a known size and shape, 5—target area divided into m grids, 6—active metasurface radome, 7—target contour obtained by compressed sensing, 8—detection target, 9—contour area covered by p grids, 10—receiving antenna unit, 11—transmitting antenna unit, 12—active metasurface radome substrate, 13—active metasurface radome basic unit, 14—varactor, 15—electrode plate.

DETAILED DESCRIPTION OF THE EMBODIMENTS

The technical scheme in the embodiments of the present disclosure will be described clearly and completely hereinafter with reference to the drawings in the embodiments of the present disclosure. Obviously, the described embodiments are only some embodiments of the present disclosure, rather than all of the embodiments. Based on the embodiments of the present disclosure, all other embodiments obtained by those skilled in the art without paying creative labor belong to the scope of protection of the present disclosure.

The purpose of the present disclosure is to overcome the shortcomings and defects existing in the prior art when detecting targets in occluded areas which cannot be penetrated by electromagnetic waves such as metal bodies and high-loss media, and provide a novel electromagnetic non-line-of-sight imaging method based on time reversal and compressed sensing, which can effectively converge target signals in occluded areas in a high scattering environment, suppress target multipath clutter, and improve imaging accuracy.

In order to make the above objects, features and advantages of the present disclosure more obvious and understandable, the present disclosure will be further explained in detail hereinafter with reference to the drawings and specific embodiments.

Figure 1:
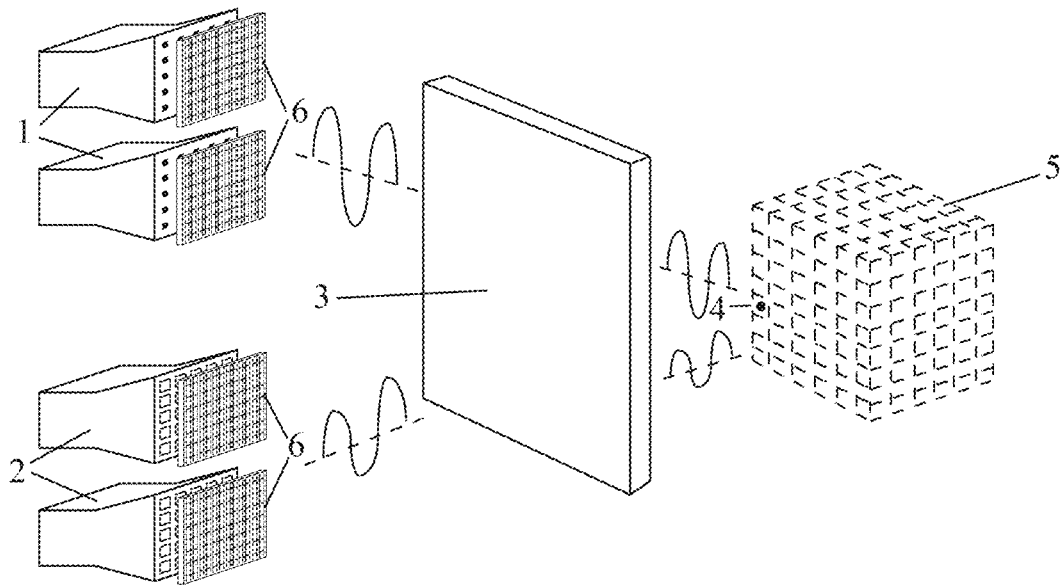
FIG. 1 is a schematic diagram of the time reversal process of fine target calibration in the occluded area according to an embodiment of the present disclosure.
Figure 2:
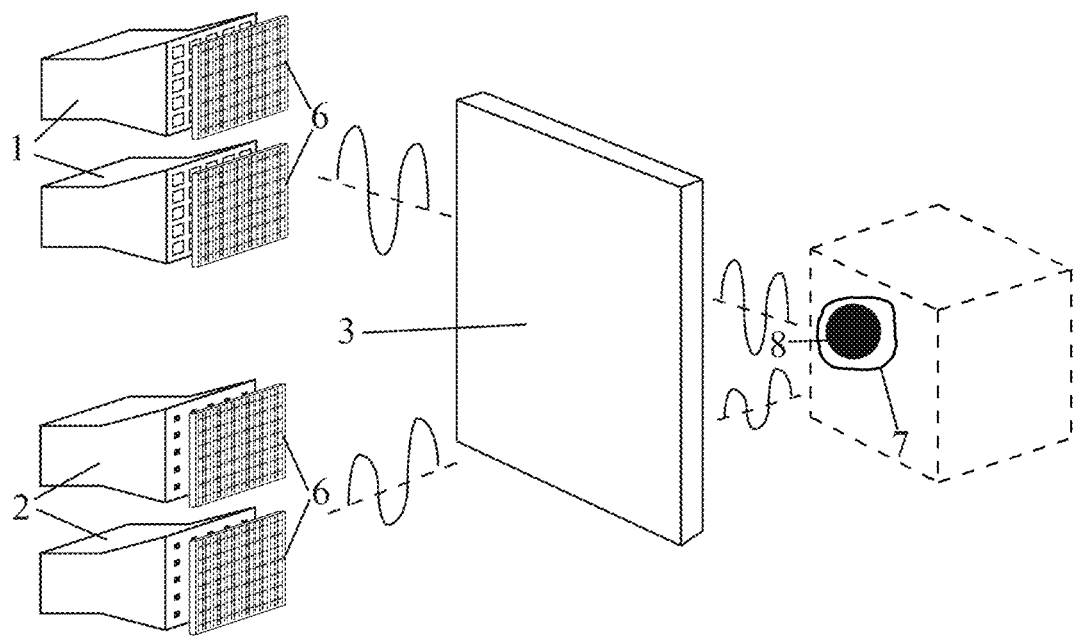
FIG. 2 is a schematic diagram of the compressed sensing process of target contour imaging in the occluded area according to an embodiment of the present disclosure.
Figure 3:
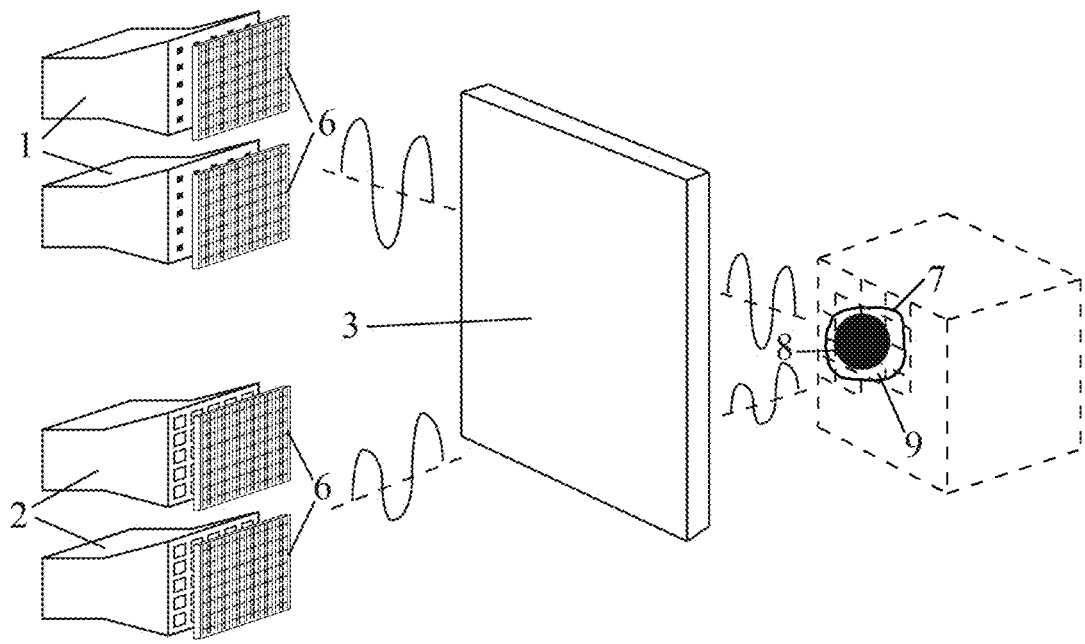
FIG. 3 is a schematic diagram of the time reversal process of finer imaging of targets in the contour area according to an embodiment of the present disclosure.

As shown in FIGS. 1-3, the target area V and the antenna array 1 in the transmitting mode/the antenna array 2 in the receiving mode are located on both sides of the wall/metal structure 3 which cannot be penetrated by electromagnetic waves, respectively.

Figure 4:
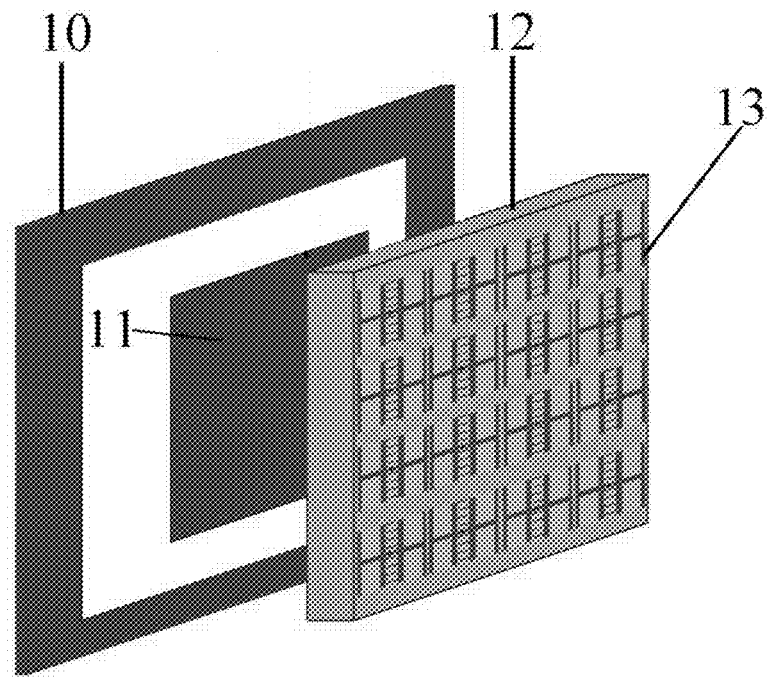
FIG. 4 is a schematic diagram of an antenna unit in transmitting mode and receiving mode according to an embodiment of the present disclosure.

As shown in FIG. 4, the antenna array 1 using the transmission mode comprises a transmitting antenna array and an active metasurface radome 6. The transmitting antenna array is formed by arranging a plurality of transmitting antenna units 11. The transmitting antenna unit 11 has a square metal sheet structure. An active metasurface radome 6 is provided in front of the transmitting surface of the transmitting antenna unit 11. Each active metasurface radome 6 comprises a radome substrate 12 and an active metasurface radome basic unit 13. The active metasurface radome basic unit 13 is installed on the radome substrate 12, and the active metasurface radome basic unit 13 in front of the transmitting surface of each transmitting antenna unit 11 arranges and forms the active metasurface radome 6 according to the same array arrangement as the transmitting antenna unit 11.

As shown in FIG. 4, the antenna array 2 using the receiving mode comprises a receiving antenna array and an active metasurface radome 6. The receiving antenna array is formed by arranging a plurality of receiving antenna units 10. The receiving antenna unit 10 has an annular metal sheet structure. An active metasurface radome 6 is provided in front of the transmitting surface of the receiving antenna unit 10. Each active metasurface radome basic unit 6 comprises a radome substrate 12 and an active metasurface radome basic unit 13. The active metasurface radome basic unit 13 is installed on the radome substrate 12. The active metasurface radome basic unit 13 in front of the transmitting surface of each receiving antenna unit 10 arranges and forms the active metasurface radome 6 according to the same array arrangement as the receiving antenna unit 10.

As shown in FIG. 4, in specific implementation, the structures of the antenna array 1 in the transmitting mode and the antenna array 2 in the receiving mode are synthesized to fabricate, that is, the square metal sheet structure of the transmitting antenna unit 11 is arranged on the annular metal sheet structure of the receiving antenna unit 10 and is located on the same plane. An active metasurface radome 6 is arranged in front of both the transmitting antenna unit 11 and the receiving antenna unit 10. The transmitting antenna unit 11 is controlled to power on during operation, and then the transmitting antenna unit 11 and the active metasurface radome 6 cooperate to realize the antenna array 1 in the transmitting mode. Alternatively, the receiving antenna unit 10 is controlled to power on during operation, and then the receiving antenna unit 10 and the active metasurface radome 6 cooperate to realize the antenna array 2 in the receiving mode.

Figure 5:
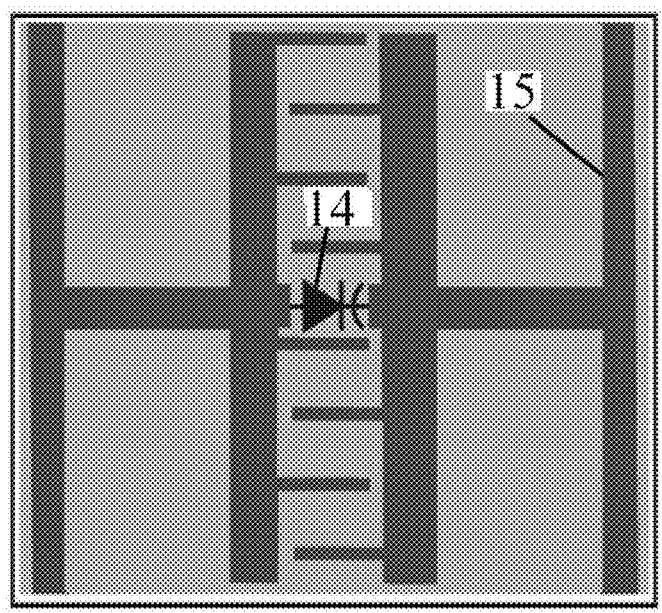
FIG. 5 is a schematic diagram of an active metasurface structural unit according to an embodiment of the present disclosure.

As shown in FIG. 5, the active metasurface radome basic unit 13 comprises two H-shaped electrode plates 15. The two electrode plates 15 are oppositely arranged. Interdigital electrodes are arranged and connected on the opposite sides of the two electrode plates 15. The opposite sides of the two electrode plates 15 are connected by varactors 14.

In order to acquire target scattering signals and generate detection signals, the receiver and the transmitter are in one-to-one correspondence with the receiving and transmitting antenna units here, so that it is convenient to use the form that multiple channels work simultaneously or separately, thus forming a variety of flexible experimental modes such as a transmitting phased array, a receiving phased array, single transmission and single reception, MIMO and so on.

Figure 6:
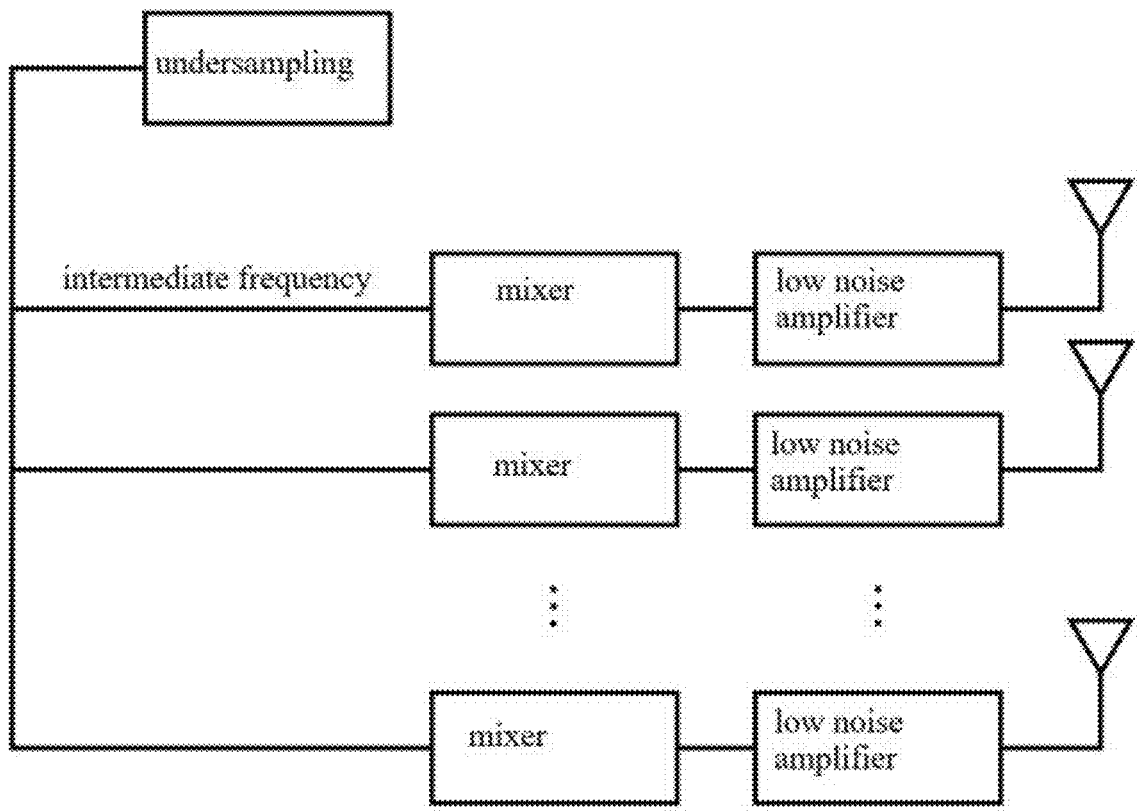
FIG. 6 is a schematic diagram of a receiver architecture according to an embodiment of the present disclosure.

As shown in FIG. 6, the receiver architecture mainly consists of a receiving antenna unit, a low noise amplifier, a mixer and a sampling circuit. The low noise amplifier is responsible for amplifying the received signal. The mixer here is a broadband mixer, which can mix any RF signal within a certain bandwidth to an intermediate frequency signal by adjusting the local oscillator frequency. Finally, multi-channel intermediate frequency signals are under-sampled by a sampling device. In the digital circuit system, the amplitude and phase relationship between multi-channel signals can be analyzed, and the signal characteristics needed for transmission can be calculated.

Figure 7:
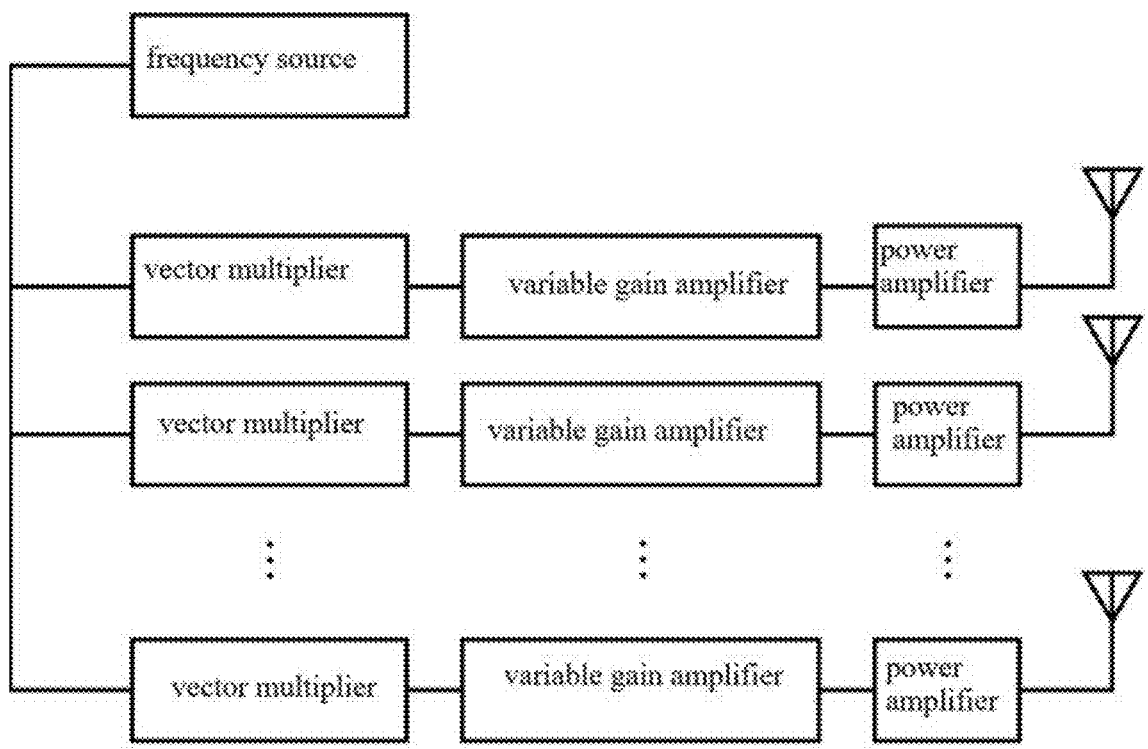
FIG. 7 is a schematic diagram of a transmitter architecture according to an embodiment of the present disclosure.

As shown in FIG. 7, each transmission path of the transmitter consists of a vector multiplier, a variable gain amplifier, a power amplifier and a transmitting antenna unit. The reference frequency generated by the frequency source is sent to different transmission channels, and can also be used as the local oscillator signal for mixing of the receiver. The vector multiplier can modulate the signal phase, and the variable gain amplifier can modulate the signal amplitude, which are the basis of generating time reversal signals. The power amplifier amplifies the final signal, and the final signal is radiated through the transmitting antenna unit.

When the antenna array in the transmitting mode operates, the active metasurface radome in front of each transmitting antenna unit can improve the control accuracy of the amplitude and the phase of the radiation field through active control, so that the system does not need more array elements and the complexity is greatly reduced. When the antenna array in the receiving mode operates, data is acquired for time reversal or data is acquired for compressed sensing imaging.

Figure 8:
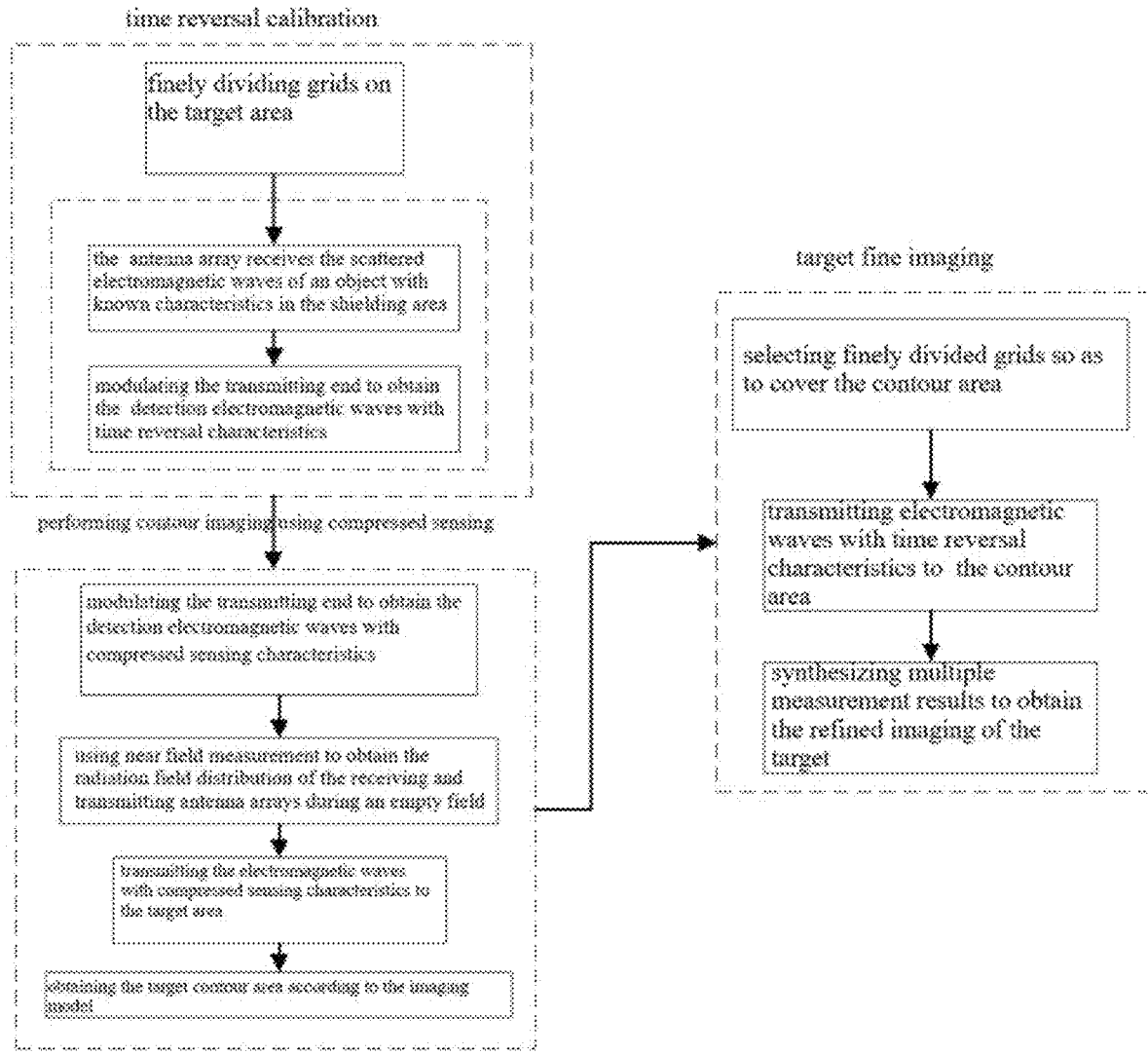
FIG. 8 is a flow chart of target imaging in an occluded area according to an embodiment of the present disclosure.

Based on the above hardware architecture, the operation and data processing flow as shown in FIG. 8 can be carried out to realize the detection of targets in the occluded area.

Step 1.1) First, calibration is performed by time reversal, two groups of antenna arrays are provided as transmitting mode and receiving mode, respectively, and active metasurface radomes are provided at the transmitting antenna array and the receiving antenna array.

Step 1.2) An unsealed target area V (denoted as 5 in FIG. 1) behind a wall/metal structure which is uncapable of being penetrated by electromagnetic waves is evenly divided into m grids, no control voltage is applied to each unit of an active metasurface radome at the transmitting antenna array and the receiving antenna array, and a metal object 4 with a known size and shape is placed in the m grids of the target area V for measurement. At each grid, the transmitting antenna array transmits electromagnetic waves to the target, and the receiving antenna array receives the scattering electromagnetic wave $E_{mtr}$ of the target.

Step 1.3) Control voltages are applied to the active metasurface radome at the transmitting antenna array in each grid, so that after the electromagnetic waves $E_{mtr}^*$ re-transmitted by the transmitting antenna array pass through the active metasurface radome, compared with the scattered electromagnetic waves $E_{mtr}$ of the target received in step 1.2), the amplitude is unchanged and the phase is opposite, thereby obtaining m groups of control voltages, where the corner mark tr represents the measured electromagnetic field in the step of time reversal.

Step 2.1) Then, contour imaging is performed on the target by using compressed sensing, the transmitting mode of the antenna array in step 1.1) is switched to the receiving mode, the receiving mode of the antenna array in step 1.1) is switched to the transmitting mode, and active metasurface radomes are provided at the transmitting antenna array and the receiving antenna array.

Step 2.2) Measurement is performed when the target area is an empty field without any object, electromagnetic waves are transmitted to the surface of the active metasurface radome by the transmitting antenna array, the scattered electromagnetic waves are received from the target by the receiving antenna array, i groups of random control voltages are applied to the active metasurface radome at the transmitting antenna array, no control voltage is applied to each unit of the active metasurface radome at the receiving antenna array, so that the electromagnetic waves emitted to the target through the active metasurface radome at the transmitting antenna array and the electromagnetic waves transmitted to the receiving antenna array through the active metasurface at the receiving antenna array have random amplitude and phase which is denoted as $E_{ics}$, and the corner mark cs represents the measured electromagnetic field in the compressed sensing step.

Step 2.3) When the target area is an empty field without any object, no control voltage is applied to each unit of the active metasurface radome at the transmitting antenna array and the receiving antenna array, and a near-field measurement method is used to obtain the amplitude and phase $E_{tcs}$ of the transmitting antenna array in the target area V and the amplitude and phase $E_{rcs}$ of the receiving antenna array in the target area V.

Step 2.4) A detection target 8 is placed in a target area V for measurement, i groups of control voltages which are the same as those in empty field measurement are applied to the active metasurface radome at the transmitting antenna array, and no control voltage is applied to each unit of the active metasurface radome at the receiving antenna array, so as to obtain the amplitude and phase $E_{totics}$ of electromagnetic waves received by the receiving antenna array.

Step 2.5) The imaging system model is established as follows:

$$g=Hf$$

$$g=(E_{totics}-E_{ics})$$

$$H=E_{tcs}E_{rcs}$$

where g denotes scattered echo signal matrix of all grids, H denotes measurement matrix of the imaging system, which is the product $E_{tcs}E_{rcs}$ of radiation fields of the transmitting antenna array and the receiving antenna array at the target area V, and f denotes target backscattering matrix of the target area.

Step 2.6) When there is a target in the target area V, i groups of control voltages in the target area V are used to obtain i groups of detection electromagnetic waves with compressed sensing characteristics for multiple measurements, and the contour area V' where the target is located is obtained by matrix inversion.

Step 3) p grids are selected from the m grids so that the p grids cover the contour area V' (denoted as 9 in FIG. 3), the p groups of detection electromagnetic waves with time reversal characteristics corresponding to the p grids are transmitted to the target for multiple measurements, the electromagnetic wave amplitude values in the p grids are normalized after each measurement, the electromagnetic wave amplitude values larger than the preset threshold are used as the imaging grid of the target, and multiple measurement results are synthesized to obtain the refined imaging of the target.

According to the present disclosure, the active metasurface radome is used to modulate the radiation direction and the phase and spatial distribution of the transmitting antenna, so as to form detection electromagnetic waves with compressed sensing and time reversal characteristics, and improve the signal strength and detection signal-to-noise ratio of the occluded area.

The present disclosure uses as few transmitting antenna units as possible to obtain more radiation amplitude and phase combinations. At the same time, the receiving channel does not need to carry out high-density measurement of the spatial distribution of the received signals, but can carry out imaging calculation with as few data received by the receiving antenna units as possible, thus having the advantages of low system implementation complexity and strong expansion capability.

The present disclosure is based on the following principles.

According to the present disclosure, the detection energy convergence of the target signal in the occluded area under the high scattering environment is realized through the time reversal technology, so that the scattering signal-to-noise ratio of the target is improved. The signal generated by the signal emitting source (which can be a primary source or a secondary source) is scattered by the target and received by the receiving antenna. The data received early spreads a short distance, while the data received late spreads a long distance. By transmitting back the received signals from their respective receiving points according to a certain time sequence, they will be reversed in time. The signals will converge at the original source position and approximately reproduce the original transmitted signals. Because the transmitted and received signals have experienced the same propagation path, based on reciprocity principle, wave propagation characteristics in time-invariant medium and time-reversal invariance of the linear wave equation, the time reversal technology combines the basic physics principle of multi-path transmission with the array signal processing technology, making full use of the reverse process of the wave propagation process, and realizing waveform recording through the receiving antenna array. The transmitting antenna array performs reverse playback, so that the transmitted and received signals can be accurately gathered at the target source position.

According to the present disclosure, the target characteristics are extracted from the received scattering field through the reconstruction algorithm of compressed sensing. Compressed sensing is a new information acquisition theory, which is a signal acquiring and reconstructing method based on sparse representation of signals, uncorrelated measurement matrix and approximation theory. According to the theory, as long as the signal is sparse or compressible on a certain basis, the structural information of the signal can be obtained at a sampling rate far lower than that required by Shannon-Nyquist sampling theorem, and then the signal can be reconstructed accurately by the reconstruction algorithm. The basic idea is to reduce the high-dimensional signal to the low-dimensional space, and obtain the observed value by random projection. This process completes sampling and compression at the same time, then uses sparse prior knowledge to process the received measured value, and finally reconstructs the original signal by solving the convex optimization problem. In the imaging process, occluded targets, obstacles and incident radiation fields interact to form scattering fields. The scattering process is related to the obstacle characteristics, environmental parameters, electrical parameter characteristics and geometric shapes of targets. The relationship among the received scattered echo, radiation field and target scattered field can be regarded as the system transfer function of the imaging system. The echo signal is the system response of the system to the target to be imaged. The target information is coupled in the received echo.

The radiation field distribution of the transmitting antenna at the position rt is expressed as $E_{ape}^t(r_t)$. According to the free space propagation theory of electromagnetic waves, the radiation field distribution function $E_{ape}^t(r)$ at the far field r can be obtained:

$$E_{rad}^t(r) = \int E_{ape}^t(r_t) \cdot g(r,r_t) dr_t$$

where $g(r, r_t)$ is the Green function in free space. In the same way, the radiation field distribution function $E_{ape}^r(r)$ at r of the receiving antenna at the position $r_r$ can be obtained:

$$E_{rad}^r(r) = \int E_{ape}^r(r_r) \cdot g(r,r_r) dr_r$$

After forming the incident radiation field, the incident radiation field interacts with the target to be imaged in the target area to form a scattering field. According to the electromagnetic scattering theory, the expression of target backscattering is obtained by using Born first-order approximation:

$$E^{sca}(r) = E_{rad}^t(r) \cdot \sigma(r)$$

Where $E^{sca}(r)$ is the scattering field distribution at position r, and $\sigma(r)$ is the backscattering coefficient at any position r in the target area.

The target scattering field is used as the secondary transmitting source, which is received by the receiving antenna at the position $r_r$, and the scattered echo signal $\text{rec}(r_r)$ at the position $r_r$ is obtained:

$$\text{rec}(r_r) = \int E_{ape}^r \cdot E^{sca}(r) \cdot g(r_r,r) dr_r$$

The key expressions of compressed sensing microwave imaging can be obtained by simplifying all the above formulas:

$$\text{rec}(r_r) = E_{rad}^t(r) E_{rad}^r \sigma(r)$$

The product $E_{rad}^t(r) E_{rad}^r$ of radiation fields of the transmitting antenna and the receiving antenna at the target area is the measurement matrix H of the imaging system, and the received electromagnetic wave signal $\text{rec}(r_r)$ is the system response of the system to the object to be imaged $\sigma(r)$. The integral characteristics of the above formula show that the target information is coupled in the received electromagnetic wave signal, and then the imaging system model can be established:

$$g = Hf$$

where g denotes scattered echo signal matrix of the target area, and f represents the backscattering matrix of the target area. When the radiation field information and the scattering signal are known, the target scattering matrix f can be obtained by the matrix inversion method, and then the contour area of the target can be obtained.

According to the present disclosure, the active metasurface radome is utilized to carry out space complex control of the radiation field, high-precision modulation is realized, and better stray scattering suppression and signal convergence effects are obtained. FIG. 4 and FIG. 5 show the structure of a single antenna unit and its active metasurface unit. The unit structure of the active metasurface used in the radome in FIG. 4 is shown in FIG. 5. The unit is connected by two sub-wavelength metal structure on the microwave substrate in an interdigital intersection manner, and a RF varactor is introduced in the connection center. One of the two metal structures is DC grounded, and the other is connected with DC source to modulate the capacitance value of the varactor. Using this unit characteristic, different control voltages can be applied to each unit so as to have different equivalent dielectric characteristics. The electromagnetic field radiated by the transmitting antenna will generate transmission fields with different amplitude and phase distribution through the metasurface units loaded with different control voltages. According to the required amplitude and phase distribution, the control voltage parameter matrix of the metasurface unit can be constructed. Applying these control voltages to the electrode plate of the radome unit can form a complex radiation field which can be formed only by more radiation units in the conventional case.

According to the present disclosure, the electromagnetic signal passively scattered by the target behind the obstacle is received by the antenna, the contour imaging of the target is realized by using compressed sensing, and the signal-to-noise ratio of the electromagnetic signal of the target is improved by using time reversal for the contour area, so as to achieve the purpose of staring at and detecting the non-line-of-sight target. Active metasurface radomes are provided at the receiving antenna array and the transmitting antenna array. According to the complex electromagnetic scattering characteristics of the occluded target, the contour imaging of the target is carried out based on the compressed sensing reconstruction algorithm. In the target contour area, time reversal operation is carried out according to the amplitude and phase of signals at different positions behind the obstacle which reach different receiving antenna arrays through complex reflection, refraction and diffraction. The amplitude and phase of signals obtained at different positions are adjusted by the active metasurface, so as to focus and scan the electromagnetic signals at different positions behind the obstacle.

According to the present disclosure, the target in the unsealed scene behind the wall and the metal structure which cannot be penetrated by electromagnetic signals can be detected, and the detection capability of the traditional detection and imaging radars is expanded. The present disclosure has wide application prospects in civil and military fields such as unmanned driving, medical imaging, radar detection in complex environments and the like.

According to the present disclosure, first, the target area is finely calibrated by using the principle of time reversal, then the contour imaging of the target is performed by using the reconstruction algorithm of compressed sensing, subsequently, the parameters of the refined area in the time reversal process are selected to cover the contour area, and the refined characteristics of the target are detected, so that the electromagnetic non-line-of-sight imaging of the target in the occluded area is realized.

The innovation and beneficial effects of the present disclosure are as follows.

In the electromagnetic wave band, the present disclosure realizes the enhancement of the detection signal of the occluded area behind the obstacle. According to the obstacles and the surrounding environment, the active metasurface structure is used to modulate the radiation direction and the phase and spatial distribution of the transmitting antenna, forming a detection beam with time reversal characteristics. Compared with the current research in the field of electromagnetism and optics, the present disclosure can improve the signal strength and the detection signal-to-noise ratio in the occluded area, and expand the detection range and application scenarios.

According to the present disclosure, contour imaging of a occluded target is obtained through compressed sensing. Multi-frequency, multi-position and multi-time data reception is carried out by using the receiving antenna array, which enriches the data volume of the received signal and obtains target contour imaging that breaks through the aperture limit. This imaging reconstructing method can overcome the defect that the traditional imaging method cannot detect the target in the occluded area, and has great flexibility in system implementation.

Compared with the existing scheme of forming a multi-transmitting array beam and acquiring multi-sensing array information for target information reconstruction in scattered signals, the present disclosure uses fewer receiving and transmitting channels and obtains higher imaging accuracy.

The present disclosure uses as few transmitting antenna units as possible to obtain more radiation amplitude and phase combinations. At the same time, the receiving channel does not need to carry out high-density measurement of the spatial distribution of the received signals, but can carry out imaging calculation with as few data received by the receiving antenna units as possible, thus having the advantages of low system implementation complexity and strong expansion capability.

In this specification, each embodiment is described in a progressive manner, and each embodiment focuses on the differences from other embodiments. It is sufficient to refer to the same and similar parts among each embodiment.

In the present disclosure, a specific example is applied to illustrate the principle and implementation of the present disclosure, and the explanation of the above embodiments is only used to help understand the method and its core idea of the present disclosure. At the same time, according to the idea of the present disclosure, there will be some changes in the specific implementation and application scope for those skilled in the art. To sum up, the contents of this specification should not be construed as limiting the present disclosure.

What is claimed is:

1. An electromagnetic non-line-of-sight imaging method based on time reversal and compressed sensing, comprising:
   step 1) evenly dividing a target area V into m grids, placing a metal object with a known size and shape in each grid in sequence when there is no target in the target area, and setting m groups of control voltages to be applied to an antenna to establish m groups of detection electromagnetic waves with time reversal characteristics;
   step 2) when there is a target in the target area V, using i groups of control voltages in the target area V to obtain i groups of detection electromagnetic waves with compressed sensing characteristics for multiple measurements, and obtaining a contour area V' by matrix inversion, wherein the target is located within the contour area V';
   wherein the step 2) specifically comprises:
   step 2.1) switching a transmitting mode of an antenna array to a receiving mode, switching the receiving mode of the antenna array to the transmitting mode, and providing active metasurface radomes at a transmitting antenna array and a receiving antenna array;
   step 2.2) performing measurement when the target area is an empty field without any object, transmitting electromagnetic waves to the surface of the active metasurface radome by the transmitting antenna array, receiving the scattered electromagnetic waves from the target by the receiving antenna array, applying i groups of random control voltages to a basic unit of the active metasurface radome at the transmitting antenna array, applying no control voltages to the basic unit of the active metasurface radome at the receiving antenna array, so that after the electromagnetic waves transmitted by the transmitting antenna array is scattered around the edge of the wall/metal structure, reaches the target, get reflected by the target, scattered by the edge of the wall/metal structure and then is received by the receiving antenna array, the electromagnetic wave at the receiving antenna array will have random amplitude and phase which is denoted as $E_{ics}$, and the corner mark cs represents the measured electromagnetic field in compressed sensing;

step 2.3) when the target area is an empty field without any object, applying no control voltage to each unit of the active metasurface radome at the transmitting antenna array and the receiving antenna array, using a near-field measurement method to obtain the amplitude and phase $E_{tcs}$ of the transmitting antenna array in the target area V and the amplitude and phase $E_{rcs}$ of the receiving antenna array in the target area V;

step 2.4) placing a detection target in a target area V for measurement, applying i groups of control voltages which are the same as those in empty field measurement to the active metasurface radome at the transmitting antenna array, and applying no control voltage to the basic unit of the active metasurface radome at the receiving antenna array, so as to obtain the amplitude and phase $E_{totics}$ of electromagnetic waves received by the receiving antenna array;

step 2.5) establishing an imaging system model as follows:

$g=Hf$ $g=(E_{totics}-E_{ics})$ $H=E_{tcs}E_{rcs}$ where g denotes scattered echo signal matrix of all grids, H denotes measurement matrix of an imaging system, which is the product $E_{tcs}E_{rcs}$ of radiation fields of the transmitting antenna array and the receiving antenna array at the target area V, and f denotes target backscattering matrix of all grids;

step 2.6) performing matrix inversion on the backscattering matrix f in step 2.5) to obtain a target contour area V' which is smaller and finer than the initial target area V; and step 3) selecting p grids from the m grids so that the p grids cover the contour area V', transmitting p groups of detection electromagnetic waves with time reversal characteristics corresponding to the p grids to the target for multiple measurements, normalizing the electromagnetic wave amplitude values in the p grids by using electromagnetic wave amplitude values larger than a preset threshold after each measurement, and synthesizing multiple measurement results to obtain a refined imaging of the target.

2. The electromagnetic non-line-of-sight imaging method based on time reversal and compressed sensing according to claim 1, wherein the step 1) specifically comprises:

step 1.1) providing two groups of antenna arrays as the transmitting mode and the receiving mode, respectively, and providing active metasurface radomes at the transmitting antenna array and the receiving antenna array;

step 1.2) evenly dividing an unsealed target area V behind a wall/metal structure which is uncapable of being penetrated by electromagnetic waves into m grids, applying no control voltage to the basic unit of the active metasurface radome at the transmitting antenna array and the receiving antenna array, and placing a metal object with a known size and shape in the m grids of the target area V for measurement, wherein at each grid, electromagnetic waves transmitted by the transmitting antenna array are scattered around the edge of the wall/metal structure and then reach the target, and the receiving antenna array receives scattered electromagnetic wave $E_{mtr}$ of the target;

step 1.3) applying control voltages to the basic unit of the active metasurface radome at the transmitting antenna array in each grid, re-transmitting electromagnetic waves $E_{mtr}*$ by the transmitting antenna array, and passing the electromagnetic waves $E_{mtr}*$ through the active metasurface radome, compared with the scattered electromagnetic waves $E_{mtr}$ of the target received in step 1.2), the amplitude is unchanged and the phase is opposite, thereby obtaining m groups of control voltages, where the corner mark tr represents the measured electromagnetic field in time reversal.

3. The electromagnetic non-line-of-sight imaging method based on time reversal and compressed sensing according to claim 1, wherein the antenna array using the transmission mode comprises the transmitting antenna array and the active metasurface radome, wherein the transmitting antenna array is formed by arranging a plurality of transmitting antenna units, the transmitting antenna unit has a square metal sheet structure, the active metasurface radome is provided in front of the transmitting surface of the transmitting antenna unit, the basic unit of the active metasurface radome comprises a radome substrate and an active metasurface structural unit, the active metasurface structural unit is installed on the radome substrate, and the basic unit of the active metasurface radome in front of the transmitting surface of each transmitting antenna unit arranges and forms the active metasurface radome according to the same array arrangement as the transmitting antenna unit.

4. The electromagnetic non-line-of-sight imaging method based on time reversal and compressed sensing according to claim 1, wherein the antenna array using the receiving mode comprises the receiving antenna array and the active metasurface radome, wherein the receiving antenna array is formed by arranging a plurality of receiving antenna units, the receiving antenna unit has an annular metal sheet structure, the active metasurface radome is provided in front of the transmitting surface of the receiving antenna unit, the basic unit of the active metasurface radome comprises a radome substrate and an active metasurface structural unit, the active metasurface structural unit is installed on the radome substrate, and the basic unit of the active metasurface radome in front of the transmitting surface of each receiving antenna unit arranges and forms the active metasurface radome according to the same array arrangement as the receiving antenna unit.

5. The electromagnetic non-line-of-sight imaging method based on time reversal and compressed sensing according to claim 3, wherein the active metasurface radome unit comprises two H-shaped electrode plates, the two H-shaped electrode plates are arranged in parallel with their long sides facing each other, interdigital electrodes are arranged and connected on the long sides facing each other of the two H-shaped electrode plates, and the long sides facing each other of the two H-shaped electrode plates are connected by varactors.

* * * * *